Feb. 19, 1963  S. P. ASH  3,077,864
PATTERN CONTROL ATTACHMENT FOR MACHINE TOOL
Filed May 29, 1959  3 Sheets-Sheet 2

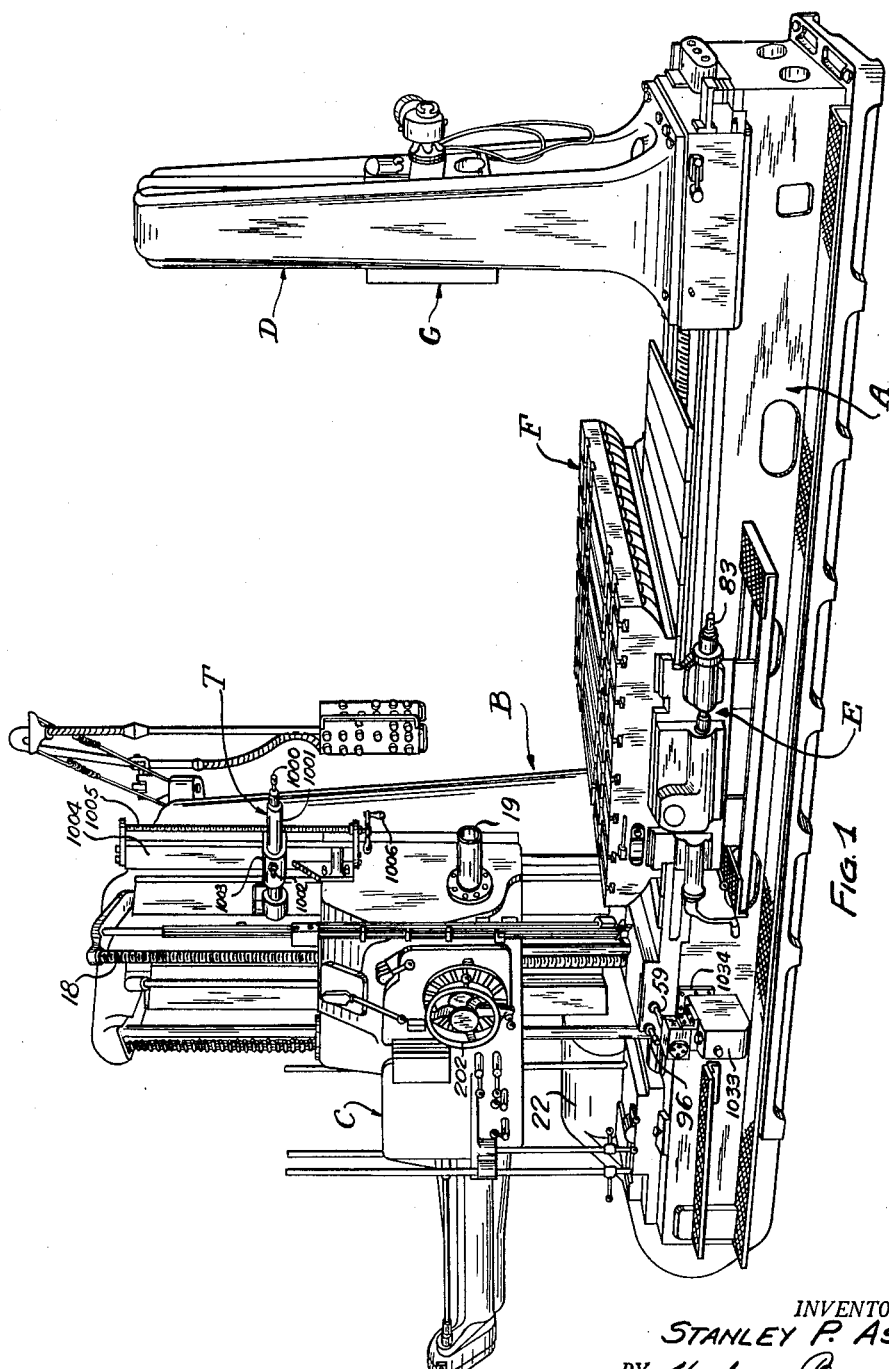

INVENTOR.
STANLEY P. ASH
BY Hudson Boughton,
Williams, David & Hoffman
ATTORNEYS

INVENTOR.
STANLEY P. ASH
ATTORNEYS

United States Patent Office 3,077,864
Patented Feb. 19, 1963

3,077,864
PATTERN CONTROL ATTACHMENT FOR
MACHINE TOOL
Stanley P. Ash, Greenville, Mich., assignor, by mesne assignments, to The New Britain Machine Company, New Britain, Conn., a corporation of Connecticut
Filed May 29, 1959, Ser. No. 816,839
3 Claims. (Cl. 121—45)

The present invention relates to automatic pattern controlled machine tools and more particularly to a pattern control apparatus that can be readily applied to and removed from conventional machine tools such as combined horizontal boring, drilling, and milling machines; lathes; milling machines; and the like.

This application is a continuation-in-part of my copending patent application Serial No. 764,417, filed September 30, 1958, now abandoned.

One of the principal objects of the invention is the provision of a new and novel simple, inexpensive, and reliable automatic pattern control apparatus for machine tools of the character referred to, comprising a tracer adapted to traverse a pattern and one or more air driven, reversible, rotary type motors controlled by the tracer for producing relative movement between a tool and work pieces so as to reproduce the pattern on the work.

Another of the principal objects of the present invention is the provision of a new and novel pattern control apparatus of the character referred to which can be readily applied to and removed from conventional machine tools with minimum modification, if any, of the machine tool to which the apparatus is applied and which can be operated from the conventional shop or factory air supply thereby avoiding leakage of hydraulic fluid and the extra maintenance and expenses normally incident to the use thereof in machine tool apparatus.

The invention resides in certain novel constructions, and combinations and arrangements of parts and further objects and advantages of the invention will be apparent to those skilled in the art to which it relates from the following description of the preferred embodiment described with reference to the accompanying drawings forming a part of this specification, in which similar reference characters designate corresponding parts, and in which:

FIG. 1 is a perspective view of a combined horizontal boring, drilling, and milling machine, having pattern control apparatus embodying the present invention connected thereto;

FIG. 4 is a perspective view illustrating the connections between the motor and solenoid operated valve of the power unit of FIG. 3;

Figure 3:
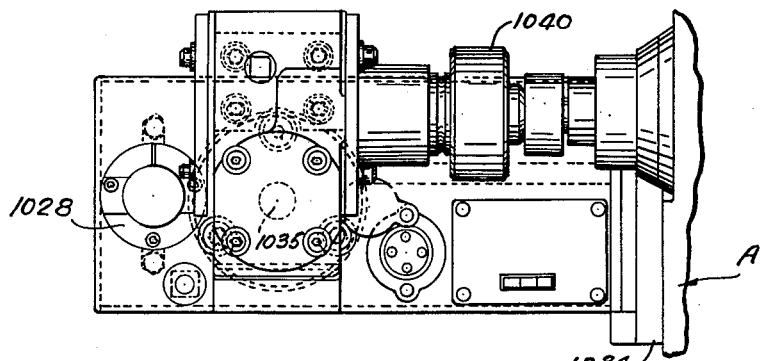
FIG. 3 is a plan view of the power unit shown in FIG. 2.
Figure 2:
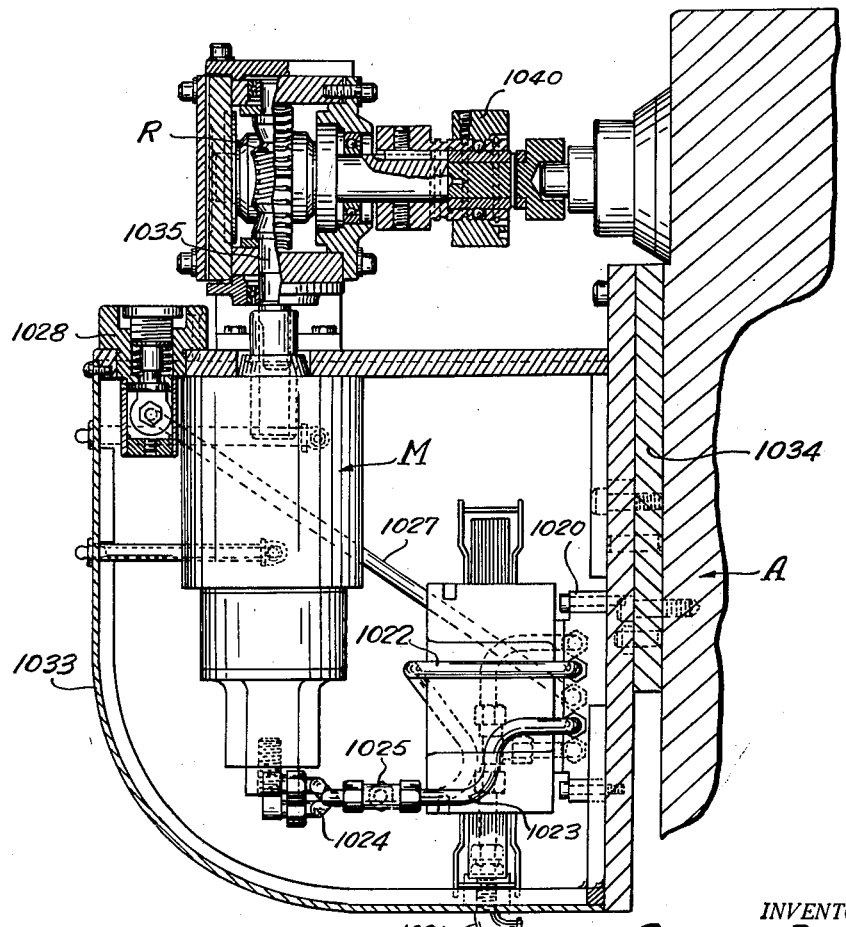
FIG. 2 is a vertical section through the drive unit connected to the front base of the machine shown in FIG. 1.
Figure 6:
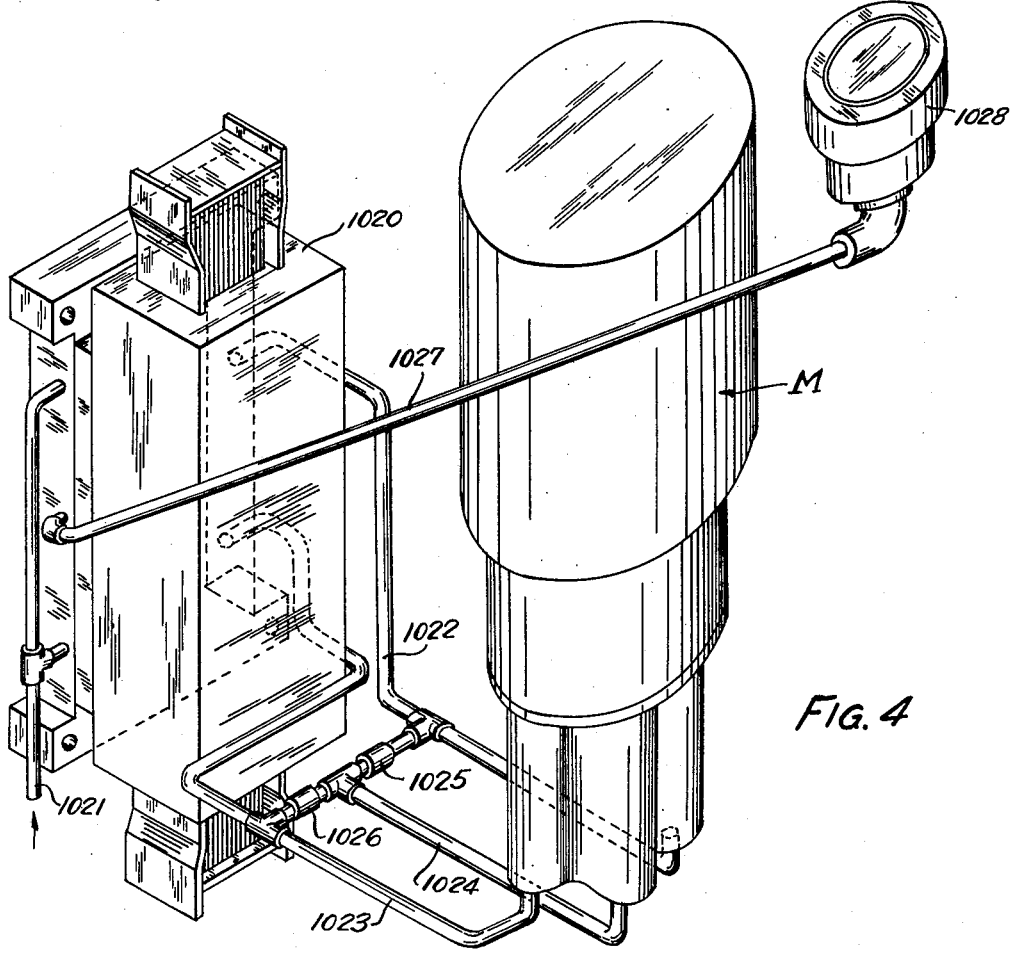
FIG. 6 is a diagrammatic view of the electrical system of the pattern control employed in the machine shown in FIG. 1.
Figure 5:
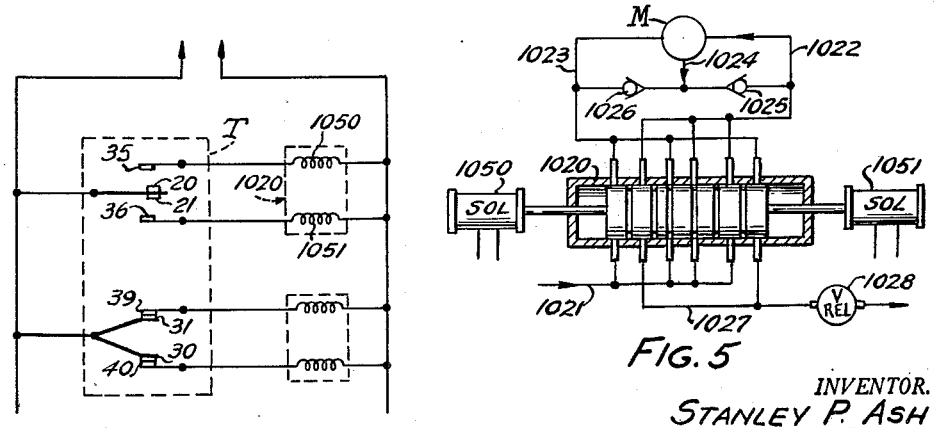
FIG. 5 is a diagrammatic view of the pneumatic system of the pattern control employed in the machine shown in FIG. 1.

While the invention is susceptible of various embodiments, and is applicable to various types of machine tools, it is herein shown and described as embodied in a specific pattern control apparatus attached to a combined horizontal boring, drilling, and milling machine of the general character shown in United States Patent No. 2,339,435, issued January 18, 1944.

The machine shown comprises a rectangular-shaped base A provided at one end with a vertical spindle head column B, having ways on its front face upon which a spindle head C is mounted for vertical movement and at the other end with a vertical backrest or outboard support column D slidably supported for movement toward and from the spindle head column B on horizontal ways on the upper side of the bed A. In addition to the outboard support column D, the bed ways support a saddle E having on its upper side transversely extending, horizontal ways which, in turn, support a work table F. The backrest column D is provided with vertical ways upon which a backrest block G is mounted for vertical movement.

The spindle head C is adapted to be moved vertically along the ways of the spindle head column B by a lead screw 18 rotatably supported in the machine in a suitable manner and having threaded engagement with a nut fixed in the spindle head. The spindle head C is provided with a generally horizontal spindle 19 rotatable and movable in opposite directions lengthwise of its axis of rotation at different speeds to effect different feeding movements by a reversible, variable speed spindle drive or main motor located within the bed A of the machine underneath a guard 22. The spindle is adapted to be rapidly traversed in opposite directions by a reversible electric motor carried on the spindle head. The backrest block or outboard support G is movable simultaneously with the movable head C by a vertical lead screw located within the backrest column D and connected to the drive or mechanism for rotating the lead screw 18. The spindle head C is reciprocable along the column B, the saddle E longitudinally of the tool spindle along the bed, and the table F transversely of the tool spindle along the saddle by hand, and a rapid traverse and feed rate power.

The aforesaid movements of the various elements such as the feed and rapid traverse of the spindle head, saddle, and table, when performed by power are effected by a reversible electric motor referred to as the feed and rapid traverse motor. The motor is supported by the bed of the machine within the guard 22, and is connected to the various machine tool elements in the manner shown and described in the aforesaid patent. The movements of the machine tool element when performed by power are controlled from a pendant control station. In addition to being movable by power, the spindle head, saddle, and table may be moved by hand through the medium of the projecting shafts 96, 59, and 83, respectively, adapted to have hand cranks applied to them.

The construction of the machine including the spindle, driving, feeding, and rapid traverse mechanisms and the spindle head, saddle and table feeding mechanisms form no part of the present invention and are not herein shown in detail, or described. They are similar to those shown in the aforementioned patent and for ready reference, the duplicate parts are designated by the same reference characters as those employed in the patent.

The tracer designated generally as T comprises a stylus 1000 supported in a cylindrical housing 1001 for limited universal movement transversely of the length of the tracer housing and axial thereof, if desired. The stylus is adapted to trace a pattern in the well known manner. The housing 1001 is adjustably clamped by a jam screw 1002 in a bracket 1003 connected to a second bracket 1004 fixed to the spindle head C of the machine. The bracket 1003 is connected to the bracket 1004 by a V-way and is vertically movable therein for adjustment purposes by a screw 1005 fixed in the bracket 1004 and in threaded engagement with a nut in the bracket 1003. The screw 1005 is fixed in the bracket 1004 against longitudinal movement therein but is rotatable therein for adjusting the tracer T vertically with reference to the spindle head. The lower end of the screw 1005 is provided with a hand crank 1006 and a graduated dial for facilitating adjustment of the tracer.

The tracer T is of the electric circuit make-and-break type and comprises two or more sets of contacts automatically opened and closed under the control of the stylus-pattern contact or relationship to control the passage of air under pressure through one or more air motors as the case may be. The tracer may be of any suitable type, for example, similar to that shown in United States Patent No. 2,372,604 issued March 27, 1945.

The work and pattern are omitted from the drawings but the machine is shown arranged to do horizontal line milling with the table F moving back and forth on the saddle E at a predetermined feed speed under the control of the conventional feed mechanism incorporated in the machine and the depth of penetration of the tool into the work controlled by the in and out movement of the work, that is, by movement of the saddle E along the bed A towards and away from the spindle head column B and head C. This movement is under the control of the tracer T and according to the present invention is effected by a reversible, positive drive air motor M detachably connected to the hand drive or crank shaft 59 of the machine for moving the saddle E.

The motor M shown is commercially available being manufactured by the Keller Division of Gardner Dever Corporation, Detroit, Michigan, under United States Patent No. 2,364,004, issued November 28, 1944 and is not herein shown and described in detail.

The motor M comprises two inlet ports and an outlet or exhaust port. A solenoid operated, four way control valve 1020, spring biased to its central position, receives air under pressure from an air supply source through a supply pipe 1021. The valve 1020 is connected by a pipe 1022 to one of the inlet ports of the motor M, and by a pipe 1023 to the other of the motor inlet ports, as is best illustrated in FIG. 4. A pipe 1024 leads from the exhaust port of the motor M and connects with two check valves 1025 and 1026, one check valve leading into the pipe 1022 and the other leading into the pipe 1023. The solenoid operated valve 1020 has an exhaust pipe 1027 leading therefrom to an adjustable air flow valve 1028 which serves as a speed control valve.

Normally, the four way valve 1020 passes air under pressure to both of the inlet ports of the motor M via the pipes 1022 and 1023, in which case the motor M, the pipes 1022 and 1023, as well as pipe 1024, will all be under the same air pressure and the motor M will remain in a stationary or stopped condition.

The solenoid operated valve 1020, when energized or actuated into a motor operating position, will continue to pass air under pressure to one of the pipes, for example, the pipe 1022, leading to an inlet port of the motor M, and will place the other of such pipes, for example, the pipe 1023, into communication with the exhaust pipe 1027. Because the other of said pipes, that is, the pipe 1023 has its pressure released to the exhaust pipe 1027, the check valve therebetween and the pipe 1024, that is, the check valve 1026, will be free to open, permitting the motor M to exhaust through the pipe 1024, the check valve 1026, the pipe 1023, the valve 1020 and the exhaust pipe 1027. Rotation of the motor M is thereby established in one direction. A similar sequence of events occurs when the solenoid operated valve 1020 is shifted to a position placing the pipe 1022 into communication with the exhaust pipe 1027, however the motor M will then rotate in the opposite or reverse direction.

It will be observed that the motor M at all times has full line pressure at one or both of the inlet ports and that the starting, stopping and reversing of the motor is effected by controlling the flow of exhaust air rather than the inlet air. This arrangement provides a very fine and positive control of the motor M resulting in the fast and accurate response necessary for a duplicator drive mechanism, formerly attainable only with more complex hydraulic motor systems.

The motor M, the solenoid valve 1020, and the air flow valve 1028 used to regulate the rate of air flow and in turn the speed of the motor M, and the other usual controls are carried by or housed within a housing 1033 connected to a bracket 1034 detachably bolted to the front of the base A adjacent to the hand crank shaft 59. The output shaft 1035 of the motor M, as shown, is connected by reduction gearing designated generally as R to a driving assembly comprising a manually operable collet or collet-like clutch 1040 which can be employed to connect or disconnect the motor M to the shaft 59 without removing the motor assembly from the machine.

The electric connections required to complete the apparatus are very simple, it being merely necessary to connect the solenoids 1050, 1051 of the valve 1020 to two sets of contacts 20, 35 and 21, 36, respectively, in the tracer T which are held open when the stylus 1000 bears against the pattern with a predetermined pressure. These contacts may be the contacts 20, 35 and 21, 36 of the tracer shown in the aforesaid Patent No. 2,372,604. The contacts 20, 35 will, when the predetermined pressure is exceeded, close and operate the solenoid 1050 of valve 1020 to place the pipe 1022 into communication with the exhaust pipe 1027, assuming that this is the valve position which releases exhaust air from the motor M so that it rotates in the direction to move the saddle and in turn the work away from the spindle head and the tool, and the pattern away from the tracer. When the pressure between the tracer and pattern drops below the predetermined pressure, contacts 21, 36 close and move the saddle in the opposite direction. When one line has been traversed across the work, the spindle head C is stepped up or down a small increment and the direction of the table feed reversed as is well understood in the art.

The present invention also contemplates the control of table cross feed as well as the in and out movements of the saddle by the tracer just as two directions of movement are controlled by the tracer in the aforesaid Patent No. 2,372,604. In this event a second air power unit similar to that shown and described is connected to the saddle E and one of the table hand crank shafts 83 for effecting the cross travel of the table and in turn the work and pattern. The second solenoid valve, corresponding to the valve 1020 of the first power unit, would be connected to two second sets of contacts 31, 39 and 30, 40 in the tracer corresponding with the contacts 31, 39 and 30, 40 of the aforesaid Patent No. 2,372,604 assuming that the tracer T is similar to the tracer shown in the Patent No. 2,372,604. In this event if the pressure between the stylus and pattern varied from a second predetermined amount the cross feed of the table would be stopped. If desired, the electric system shown in said Patent No. 2,372,604 could be incorporated in the present device, it being understood however that the pump motor and the controller therefor would be omitted. It is also contemplated in the present invention that relays can be incorporated between the tracer contacts and the solenoids of the solenoid valves. In this event it is not necessary for the tracer contacts to carry full solenoid valve current but merely the current required to operate the relays which in turn operate the solenoid valves. It will also be understood that in the event relays are employed as suggested lower voltages may be used in the tracer circuits than that employed to operate the solenoid valves.

Although the air driven motor M has been described as being controlled as to starting, stopping, and reversing by valve means located on the exhaust side of the motor, such motor functions can also be controlled by valve means in the supply side of the motor, as is fully described and illustrated in my previously mentioned co-pending application.

While the machine shown has been described with respect to horizontal line milling utilizing a horizontal table feed and movement of the saddle to control the depth of cut, it is to be understood that vertical line milling can be effected with the machine shown by merely connecting the second power unit to the bed A and the hand crank shaft 96 which moves the spindle head C vertically along the column ways. The spindle 19 can be employed to control the depth of cut in place of the saddle E if desired by connecting the first power unit, that is, the one shown connected to the hand crank shaft 59, to the spindle head C and to the spindle hand feed wheel 202. This would necessitate the substitution of a different form of connection between the air motor and the hand wheel than the collet-type clutch shown. Any suitable connection could be used. A different form of bracket than the bracket 1034 shown would probably be required to connect the housing 1033 etc. to both the saddle F and the spindle head C.

It will be apparent from the foregoing that the objects of the invention heretofore enumerated and others have been accomplished and that there has been provided a new and novel tracer attachment for a machine tool or a new and improved machine tool suitable for producing articles such as dies from patterns which will operate on air under pressure such as a conventional shop air supply, is simple in construction and reliable in operation and which will not interfere with the normal use of the machine.

While the preferred embodiment of the invention has been described in considerable detail the invention is not limited to the details of construction shown and referred to but may be otherwise embodied and it is the intention to hereby cover all adaptations, modifications and uses thereof which come within the scope and spirit of the appended claims.

Having thus described my invention, what I claim is:

1. In a tracer control apparatus; a tracer including a single movable control element adapted to engage a pattern and having a predetermined position; a reversible rotary type air motor having discrete air inlet conduits for each of its two directions of rotation, an exhaust conduit system, and a rotatable output shaft; means for detachably connecting said output shaft of said motor to a normally hand rotatable feed shaft of a machine tool; valve means for controlling the application and flow of pressure air to said inlet conduits selectively; and electric means connecting said tracer and said valve means to actuate said valve means in response to displacement of said control element from said position to cause said feed shaft to rotate.

2. In a tracer control apparatus: a tracer including a single movable control element adapted to engage a pattern and disposable in opposite directions from a predetermined position; a reversible rotary type air motor having discrete air inlet conduits for each of its two directions of rotation, an exhaust conduit system, and a rotatable output shaft; means for detachably connecting said output shaft of said motor to a normally hand rotatable feed shaft of a machine tool; valve means for controlling the application of pressure air to said inlet conduits selectively; and means connecting said tracer and said valve means to actuate said valve means in response to displacement of said control element in a first direction from said predetermined position to cause said feed shaft to rotate in a first direction of rotation and in response to displacement of said control element in a second direction from said predetermined position opposite said first direction to cause said feed shaft to rotate in a second direction of rotation opposite said first direction of rotation.

3. In a tracer control apparatus, a tracer including a single movable control element adapted to engage a pattern and disposable in two opposite directions from a predetermined position; a reversible rotary type air motor having discrete inlet conduits for each of its two directions of rotation, an exhaust conduit system, and a rotatable output shaft; means for detachably connecting said motor to a normally hand rotatable feed shaft of a machine tool; valve means for controlling the application of pressure air to said inlet conduits selectively and the flow of air through said exhaust conduit system; and means connecting said tracer and said valve means to actuate said valve means in response to displacement of said control element from said predetermined position in a first direction to cause said feed shaft to rotate in a first direction of rotation and in response to displacement of said control element in a second direction from said predetermined position opposite said first direction to cause said feed shaft to rotate in a second direction of rotation opposite said first direction of rotation.

References Cited in the file of this patent

UNITED STATES PATENTS

| | | |
|---|---|---|
| 2,243,656 | Shannon | May 27, 1941 |
| 2,660,985 | Ernst | Dec. 1, 1953 |
| 2,674,232 | Mason | Apr. 6, 1954 |
| 2,718,819 | Stephan | Sept. 27, 1955 |
| 2,767,620 | Bentley | Oct. 23, 1956 |
| 2,840,956 | Grinage | July 1, 1958 |